(12) United States Patent
Sogabe

(10) Patent No.: US 7,446,976 B2
(45) Date of Patent: Nov. 4, 2008

(54) TAPE CARTRIDGE WITH VISIBLE MANAGEMENT INFORMATION

(75) Inventor: Teruo Sogabe, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 312 days.

(21) Appl. No.: 11/290,561

(22) Filed: Dec. 1, 2005

(65) Prior Publication Data

US 2006/0132974 A1 Jun. 22, 2006

(30) Foreign Application Priority Data

Dec. 8, 2004 (JP) ............................. 2004-355790

(51) Int. Cl.
*G11B 23/02* (2006.01)

(52) U.S. Cl. .................................................. 360/132

(58) Field of Classification Search ................. 360/132; 242/338.1, 348.1–348.2
See application file for complete search history.

(56) References Cited

U.S. PATENT DOCUMENTS

| | | | |
|---|---|---|---|
| 4,320,421 A * | 3/1982 | Larson et al. ................. 360/60 |
| 4,814,923 A * | 3/1989 | Kawada et al. .............. 360/132 |
| 4,844,378 A * | 7/1989 | Oishi ......................... 242/344 |
| 4,889,982 A * | 12/1989 | Young et al. ................. 235/494 |
| 5,303,034 A * | 4/1994 | Carmichael et al. ......... 356/620 |
| 5,504,644 A * | 4/1996 | Sasaki et al. ................. 360/132 |
| 5,699,216 A * | 12/1997 | Doty ........................... 360/132 |
| 5,786,967 A * | 7/1998 | Gerfast et al. ............... 360/132 |
| 5,971,281 A * | 10/1999 | Frary et al. .................. 235/487 |
| 6,031,675 A * | 2/2000 | Sanpei et al. ................. 360/60 |
| 6,226,688 B1 * | 5/2001 | Frary .......................... 719/310 |
| 6,717,766 B2 * | 4/2004 | Hashimoto et al. ............ 360/92 |
| 6,744,595 B2 * | 6/2004 | Blair et al. .................. 360/132 |
| 6,866,216 B2 * | 3/2005 | Hiraguchi ................ 242/348.2 |
| 6,970,318 B2 * | 11/2005 | Goodman et al. ............. 360/69 |
| 7,048,220 B2 * | 5/2006 | Davis ......................... 242/348 |
| 2003/0030938 A1 | 2/2003 | Hashimoto et al. |
| 2004/0201921 A1 * | 10/2004 | Vanderheyden et al. ..... 360/132 |

FOREIGN PATENT DOCUMENTS

JP 2003-059143 A 2/2003

* cited by examiner

*Primary Examiner*—Angel A. Castro
(74) *Attorney, Agent, or Firm*—Birch, Stewart, Kolasch & Birch, LLP

(57) ABSTRACT

A tape cartridge includes a case, a magnetic tape stored in the case, a movable member slidably or movably mounted on the case and having a display portion visible from an outside of the case, a plurality of management information sets about the tape cartridge are displayed on the display portion, and a plurality of the information sets include one or more information sets different from each other.

14 Claims, 13 Drawing Sheets

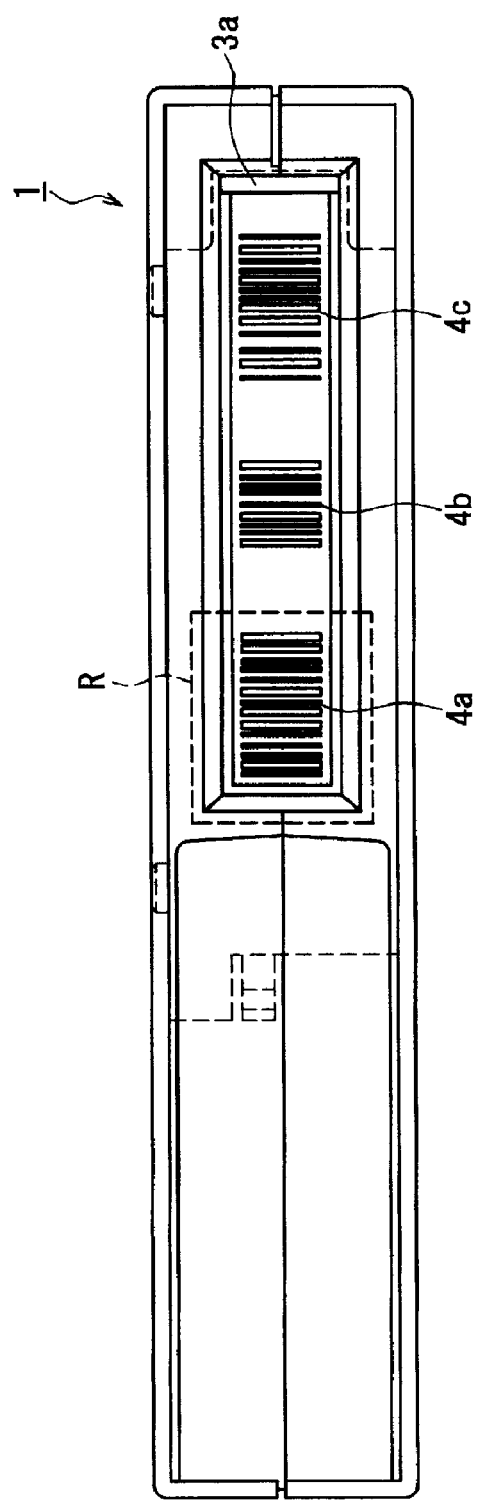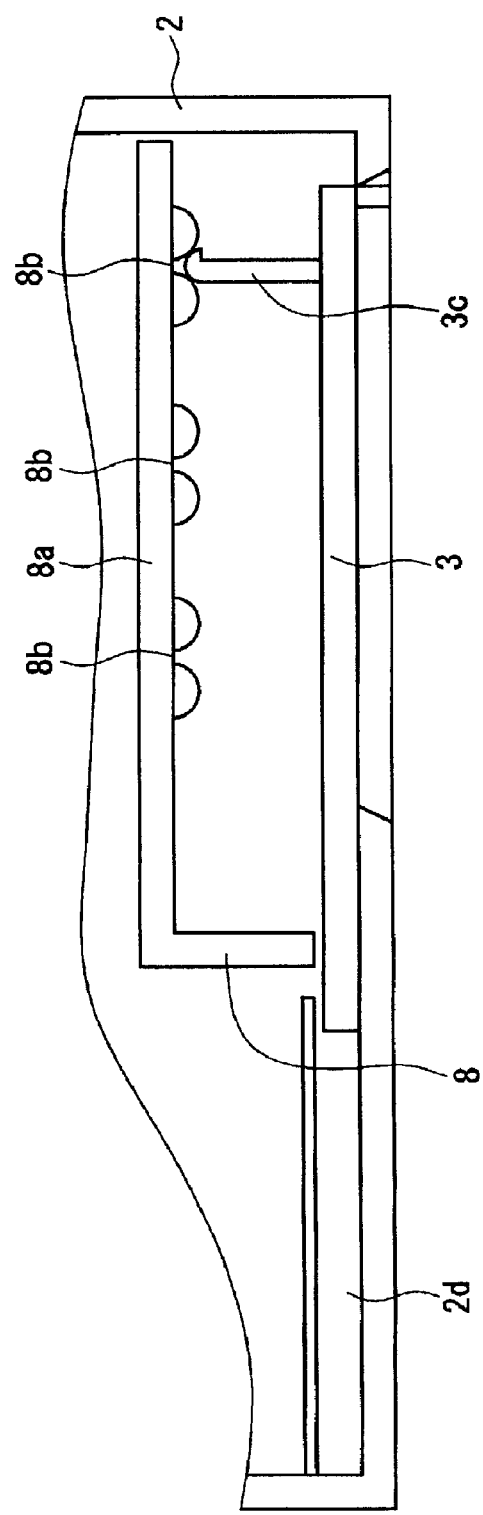

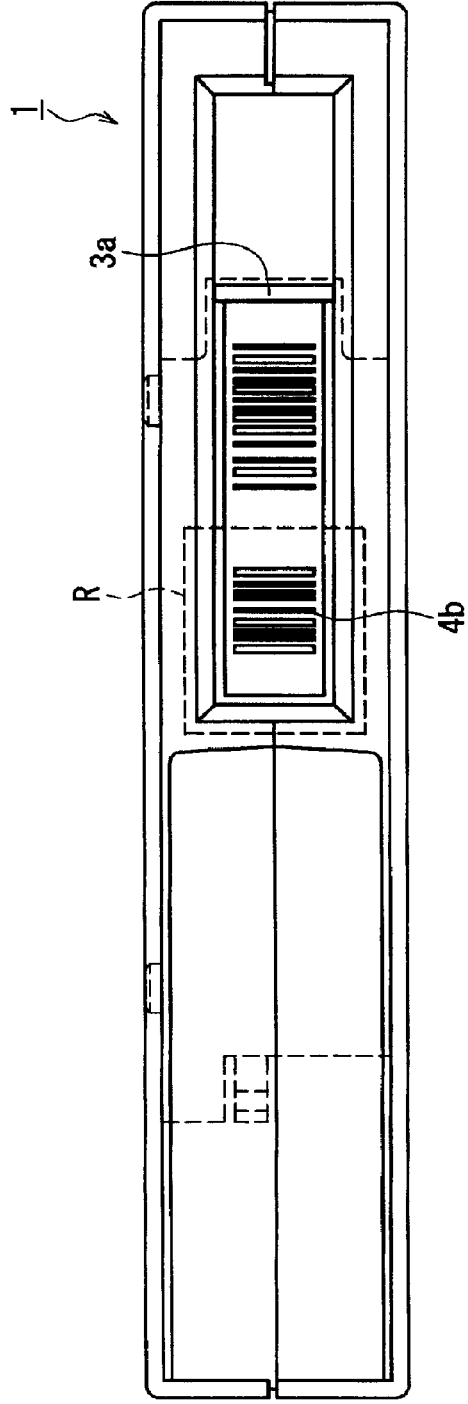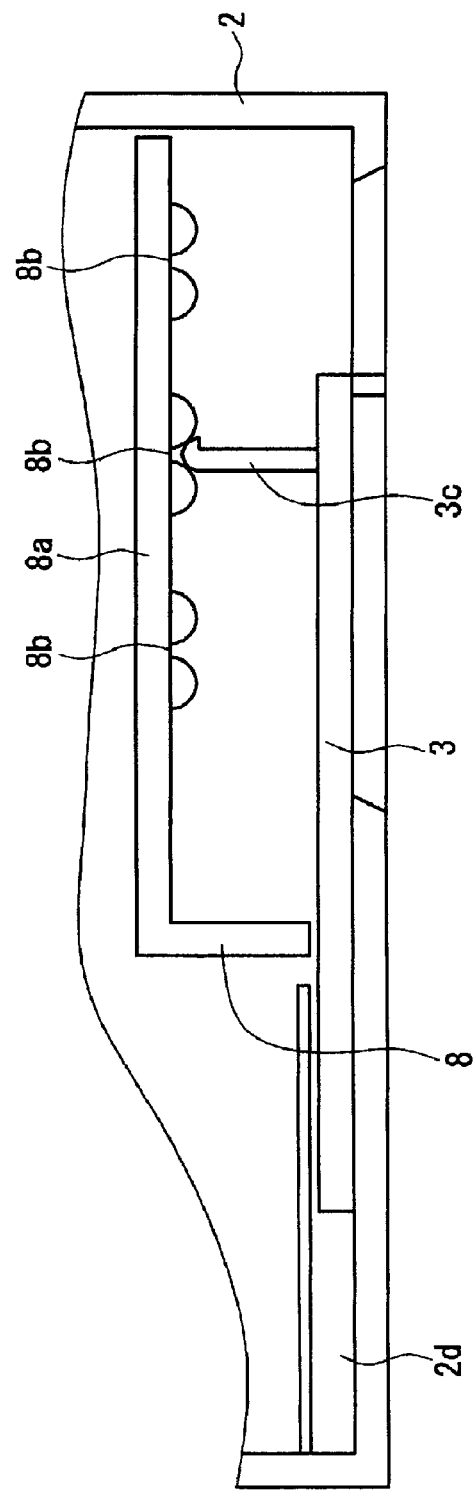
Fig. 4A
Fig. 4B

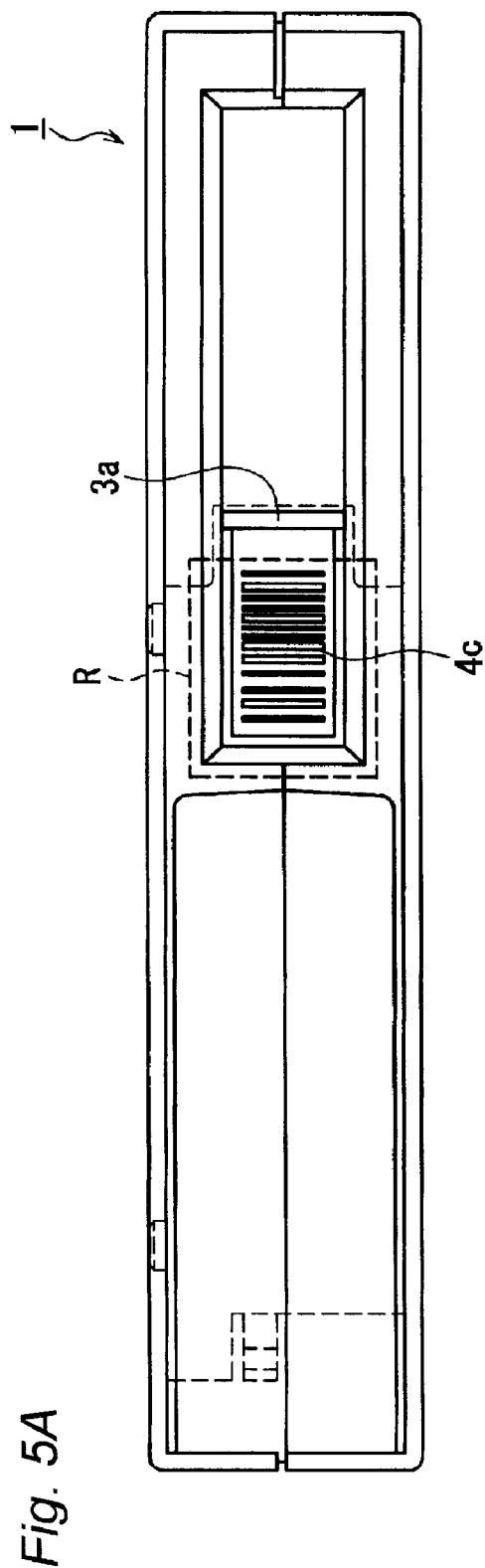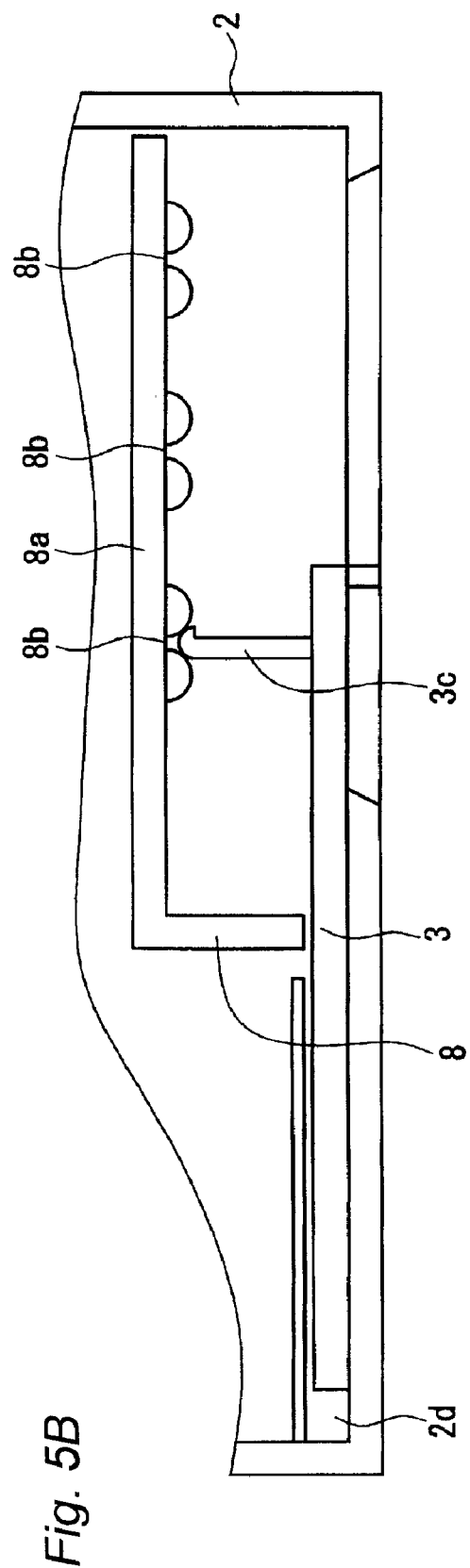

TAPE CARTRIDGE WITH VISIBLE MANAGEMENT INFORMATION

BACKGROUND OF THE INVENTION

The present invention relates to a tape cartridge.

Media for data backup purposes, i.e., tape cartridges in which magnetic tapes are stored in cases, are used in a tape cartridge storage rack called a library. Thousands to tens of thousands of tape cartridges are stored in the library in loadable and unloadable manners. A specified tape cartridge stored in the library is chucked by a robot arm and transported to a specified drive. In this case, the robot arm reads management information (e.g., barcodes) displayed on the rear face of the tape cartridge to identify whether or not it is a desired tape cartridge. As shown in FIG. 15, management information 14a is printed on a label 14, which is affixed to a specified location of the case.

An information recognition portion of the robot arm targets only a specified region of the case for its recognition operation. Therefore, the label is affixed to the case in such a way that the management information falls within the recognition region that is the recognition target.

When users of the tape cartridges desire to change the contents of management information, they need to prepare labels with updated management information printed thereon, and replace old labels with the updated labels in such a way that the updated management information falls within the recognition region. Such replacement of labels were very burdensome to users and degraded efficient management of data. Thus, in conventional tape cartridges, management information could not be changed without replacement of labels.

SUMMARY OF THE INVENTION

An object of the present invention is to provide a tape cartridge allowing management information to be changed without replacement of labels.

A tape cartridge of the present invention includes a case, a magnetic tape stored in the case, and a movable member slidably or movably mounted on the case and having a display portion at least part of which is visible from an outside of the case, wherein a plurality of management information sets about the tape cartridge are displayed on the display portion, and a plurality of the management information sets include one or more information sets different from each other.

The tape cartridge of the present invention includes a movable member slidably or movably mounted on the case and having a display portion at least part of which is visible from the outside of the case, a plurality of management information sets about the tape cartridge are displayed on the display portion, and a plurality of the management information sets include one or more information sets different from each other, so that users can select a specified management information set from a plurality of the management information sets by sliding or rotating the movable member. More particularly, in the tape cartridge of the present invention, management information can be changed without replacement of labels.

BRIEF DESCRIPTION OF THE DRAWINGS

The present invention will be further described with reference to the accompanying drawings wherein like reference numerals refer to like parts in the several views, and wherein:

FIG. 1A is a perspective view showing one example of a tape cartridge of a first embodiment, while

FIG. 2A is a plane view showing a movable member constituting the tape cartridge shown in FIG. 1A, while

FIG. 3A is a rear view showing the tape cartridge shown in FIG. 1A, while FIG. 3B is a plane view showing the same;

FIG. 4A is a rear view showing the tape cartridge shown in FIG. 1A, while FIG. 4B is a plane view showing the same;

FIG. 5A is a rear view showing the tape cartridge shown in FIG. 1A, while FIG. 5B is a plane view showing the same;

FIG. 8A is a rear view showing the tape cartridge shown in FIG. 7, while

FIG. 9A is a rear view showing the tape cartridge shown in FIG. 7, while FIG. 9B is a plane view showing the same;

FIG. 10A is a rear view showing the tape cartridge shown in FIG. 7, while

FIG. 11A is a perspective view showing one example of a tape cartridge of a third embodiment, while

DETAILED DESCRIPTION OF THE PREFERRED EMBODIMENTS

First Embodiment

Figure 1A:
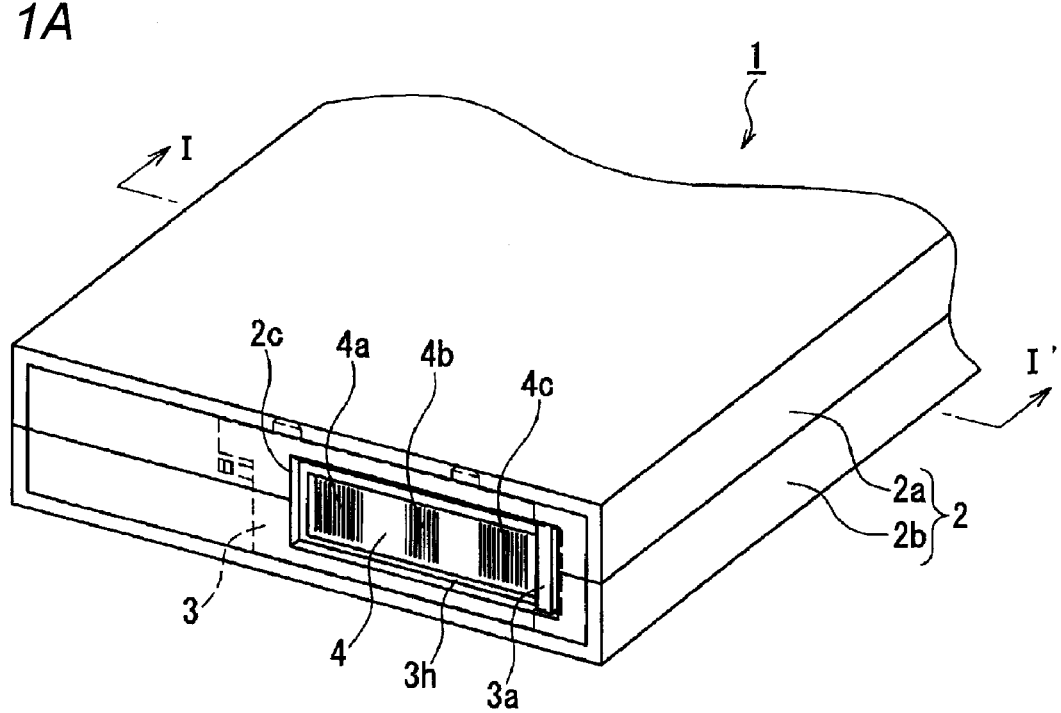
Figure 1B:
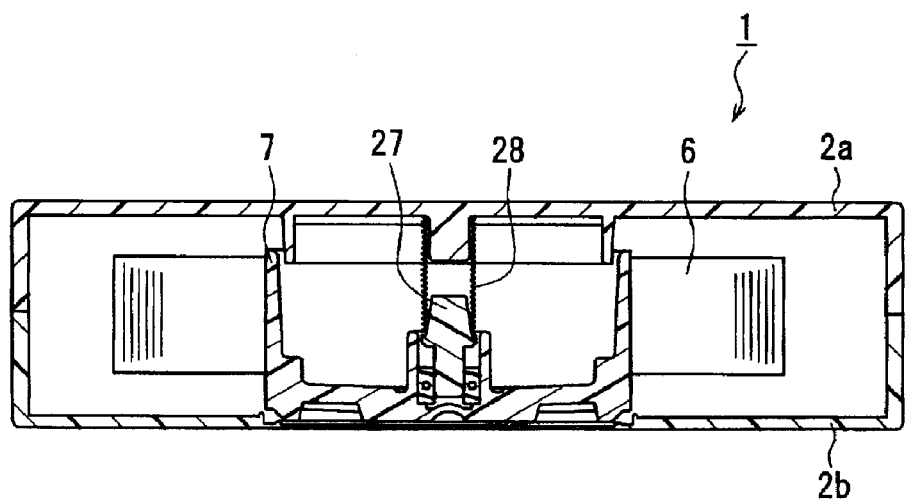
FIG. 1B is a cross sectional view taken along line I-I' in FIG. 1A.
Figure 2A:
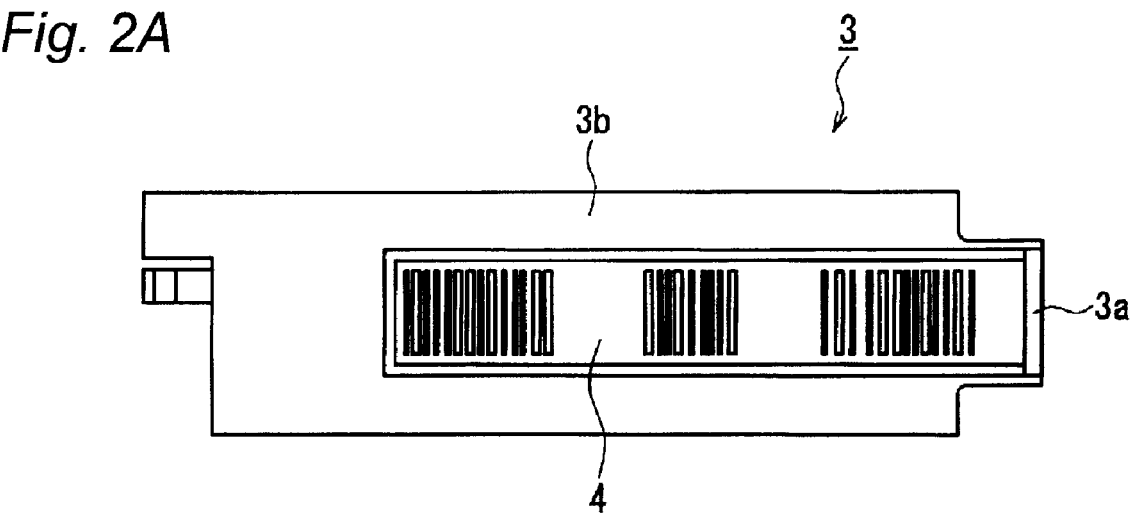
Figure 2B:
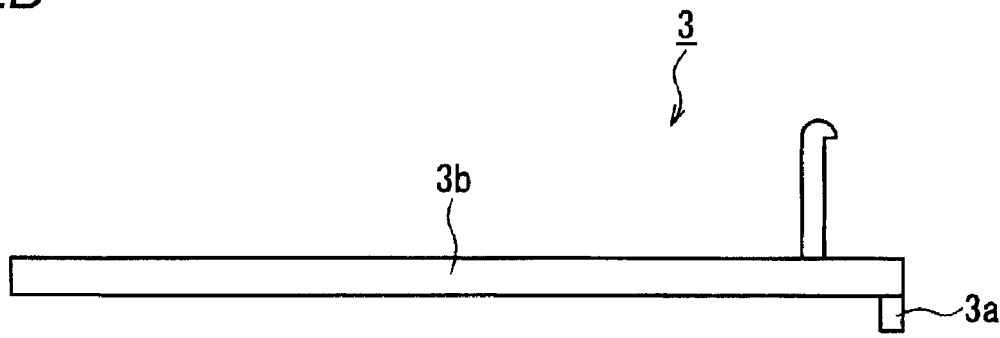
FIG. 2B is a side view showing the movable member.

FIG. 1A is a perspective view showing a tape cartridge in this embodiment, while FIG. 1B is a cross sectional view taken along line I-I' in FIG. 1A. FIG. 2A is a plane view showing a movable member constituting the tape cartridge in this embodiment, while FIG. 2B is a side view showing the same. FIG. 3A, FIG. 4A and FIG. 5A are rear views showing the tape cartridge shown in FIG. 1A, while FIG. 3B, FIG. 4B and FIG. 5B are plane views showing the tape cartridge shown in FIG. 1A without an upper cover 2a.

As shown in FIG. 1A and FIG. 1B, the tape cartridge 1 in the present embodiment is composed of a case 2 and a magnetic tape 6 stored in the case 2. The case 2 is formed from an upper cover 2a and a lower cover 2b which are joined by screws and the like. The magnetic tape 6, which is wound around a reel 7 that is rotatably housed in the case 2, is feedable from the case 2. In the case 2, the reel 7 is depressed downward as viewed in FIG. 1B by a helical compression spring 28 acting through a shaft 27. This prevents the reel 7 not in use from idly rotating.

As shown in FIG. 1A, the tape cartridge 1 includes a movable member 3 slidably mounted on the case 2. The movable member 3 has a display portion 3h visible from the outside of the case 2. The movable member 3 is slidable in a specified range along, for example, a guide groove 2d (see FIGS. 3B, 4B and 5B) formed on the case 2. A label 4 displaying a plurality of management information sets about the tape cartridge 1 is affixed to the display portion 3h in the movable member 3. In the tape cartridge of the present embodiment, a plurality of the management information sets 4a to 4c include one or more information sets different from each other.

As shown in FIG. 2A and FIG. 2B, the movable member 3 includes an operation portion 3a and a plate portion 3b slidable along a specified lateral face of the case 2. In the tape cartridge in the present embodiment, the label 4 is affixed to the plate portion 3b.

As shown in FIG. 1A, the operation portion 3a is disposed within an operation window 2c formed, for example, on the rear face of the case for allowing the movable member 3 to be operated from the outside of the case. The operation portion 3a, which is horizontally slidable by the hand, can be disposed in a specified position inside the operation window 2c.

As shown in FIG. 3A, when a management information set 4a among a plurality of management information sets 4a, 4b and 4c is disposed, by sliding operation of the operation portion 3a, in a recognition region R recognizable by an information recognition portion of a robot arm, the management information set 4a is read by the information recognition portion during chucking of the tape cartridge 1 by the robot arm.

As shown in FIG. 4A, when a management information set 4b among a plurality of the management information sets is disposed in the recognition region R by sliding operation of the operation portion 3a, the management information set 4b is read by the information recognition portion of the robot arm during chucking of the tape cartridge 1 by the robot arm.

As shown in FIG. 5A, when a management information set 4c among a plurality of the management information sets is disposed in the recognition region R by sliding operation of the operation portion 3a, the management information set 4c is read by the information recognition portion of the robot arm during chucking of the tape cartridge 1 by the robot arm.

Thus, the tape cartridge 1 in the present embodiment includes the movable member 3 slidably mounted on the case 2 and having the display portion 3h visible from the outside of the case 2, a plurality of the management information sets about the tape cartridge 1 are displayed on the display portion 3h, and a plurality of the management information sets 4a to 4c include one or more information sets different from each other, so that users can select a specified management information set from a plurality of the management information sets 4a to 4c by sliding the movable member 3. Consequently, in the tape cartridge 1 in the present embodiment, the management information can be changed without replacement of the label 4, which makes it possible to enhance the management efficiency of data stored in the magnetic tape (see FIG. 1A).

As shown in FIGS. 3B, 4B and 5B, it is preferable that the movable member 3 includes an engagement piece 3c protruding to the inside of the case, and that the tape cartridge has a guide wall 8 fixed onto the case 2 so as to be orthogonal to the engagement piece 3c. The guide wall 8 has a plurality of engagement portions 8b along a sliding direction of the movable member 3. A plurality of the engagement portions 8b are formed on a face of a plate portion 8a of the guide wall 8 disposed in parallel with the sliding direction of the movable member 3, the face facing the movable member 3. When the engagement piece 3c is retained by each of the engagement portions 8b, the movable member 3 is retained in a specified position (when the engagement piece 3c is engaged with each of the engagement portions 8b, the movable member 3 is retained in a specified position).

Thus, the movable member 3 has the engagement piece 3c, and the tape cartridge has the guide wall 8 having a plurality of the engagement portions 8b, so that the operation to dispose the movable member 3 in a specified position can be performed easily and reliably.

The shape of the respective engagement portions 8b is not particularly limited as long as the engagement portions can temporarily retain the engagement piece 3c. As shown in FIGS. 3B, 4B and 5B, it is preferable that the engagement portions are, for example, groove portions formed between protruding portions by forming a pair of semispheric protruding portions on the plate portion 8a. The respective engagement portions 8b having such a shape make it possible to obtain both appropriate retention power to retain the engagement piece 3c and sliding operability of the movable member 3.

The material and shape of the engagement piece 3c are not particularly limited as long as the engagement piece 3c can temporarily be retained by the respective engagement portions 8b. It is preferable that the engagement piece 3c is, for example, in an almost rod shape, and can be elastically deformed upon coming into contact with the guide wall 8. Appropriate characteristics of the engagement piece 3c such as elasticity and rigidity should be determined by appropriate selection of the material and shape of the engagement piece 3c. Acceptable materials of the engagement piece 3c include those identical to the materials of the case such as polycarbonate (PC) resins, acrylonitrile-butadien-styrene (ABS) resins and polyoxymethylene (POM) resins.

Each of a plurality of management information sets 4a to 4c may include a plurality of information sets different from each other or may include only one information set.

Information included in each information set includes basic information sets such as manufacturer name, category, lot number, serial number and capacity. The management information sets may include various information sets depending on users' needs such as department code, year, month and day of the week in addition to the basic information sets.

In the case where, for example, respective management information sets include a different department code information set, the movable member 3 may be slid and the management information disposed in the recognition region R is changed depending on user's needs, so that the department code read by the information recognition portion of the robot arm may be changed.

Figure 6A:
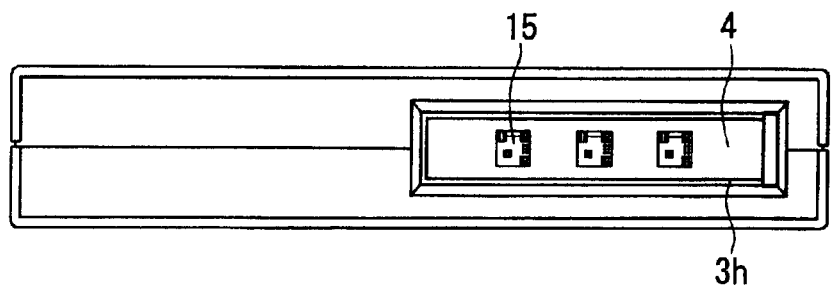
FIGS. 6A to 6G are rear views showing other examples of a tape cartridge of the first embodiment.
Figure 6B:
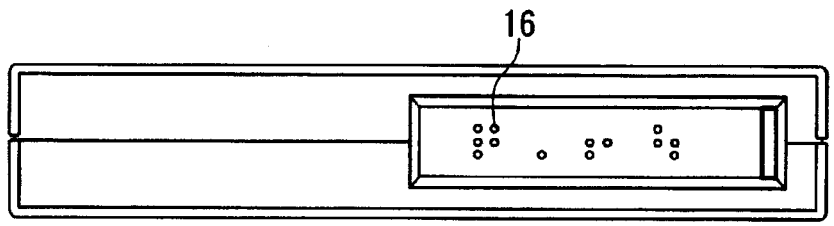
Figure 6C:
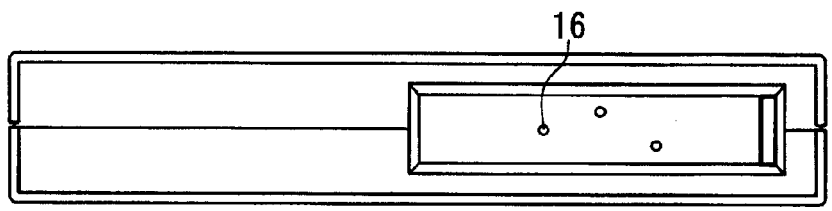
Figure 6D:
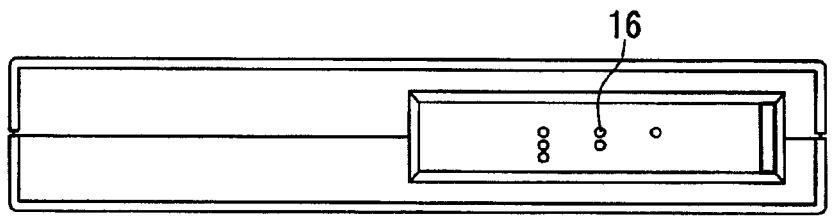
Figure 6E:
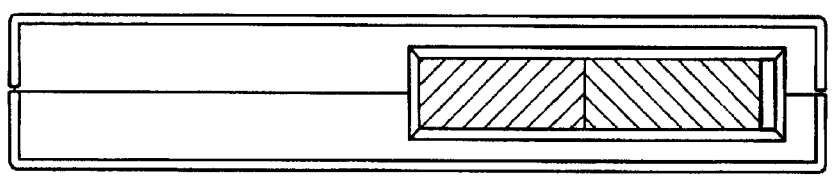
Figure 6F:
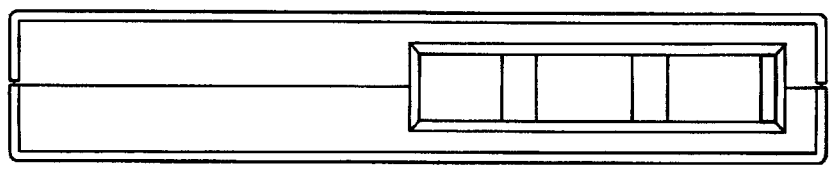
Figure 6G:
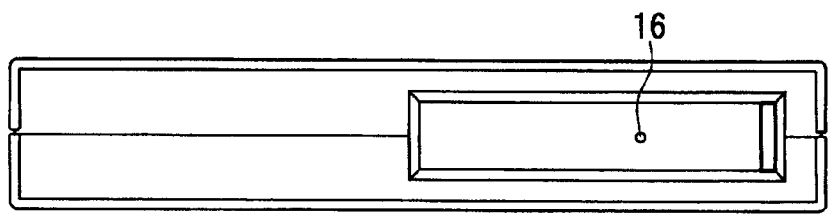

Although the display format of the management information sets 4a to 4c is barcodes in the example shown in FIG. 1A to FIG. 5B, the display format of the management information sets is not limited thereto. As shown in FIG. 6A or FIG. 6G, the display format of the management information sets may be, for example, two-dimensional codes 15 (FIG. 6A), patterns of protrusions 16 (FIG. 6B), positions of the protrusions 16 (FIG. 6C), the number of the protrusions 16 (FIG. 6D), extrusion or indention patterns (FIG. 6E), the depth of recess portions (FIG. 6F) and the presence of the protrusions 16 (FIG. 6G).

The management information sets may be displayed on the display portion 3h by affixing the label 4 with the management information sets printed thereon to the display portion 3h as shown in FIG. 6A, or they may directly be printed on the movable member 3. Moreover, as shown in FIGS. 6B to 6G, the protrusions 16, the extrusion or indention patterns and the recess portions may directly be formed on the movable member 3.

Although the number of the management information sets in the example shown in FIG. 1A to FIG. 5B is three, the number of the management information sets is not limited thereto as long as the number is not less than one. For example, the number may be two (see FIG. 6E to 6G) or may be four or more (see FIG. 6B).

The label 4 affixed to the display portion 3h of the movable member may be, for example, a removable layered produce. An uppermost layer with a plurality of management information sets printed thereon is removed and a plurality of other management information sets may be printed on a new printing face.

Second Embodiment

Figure 7:
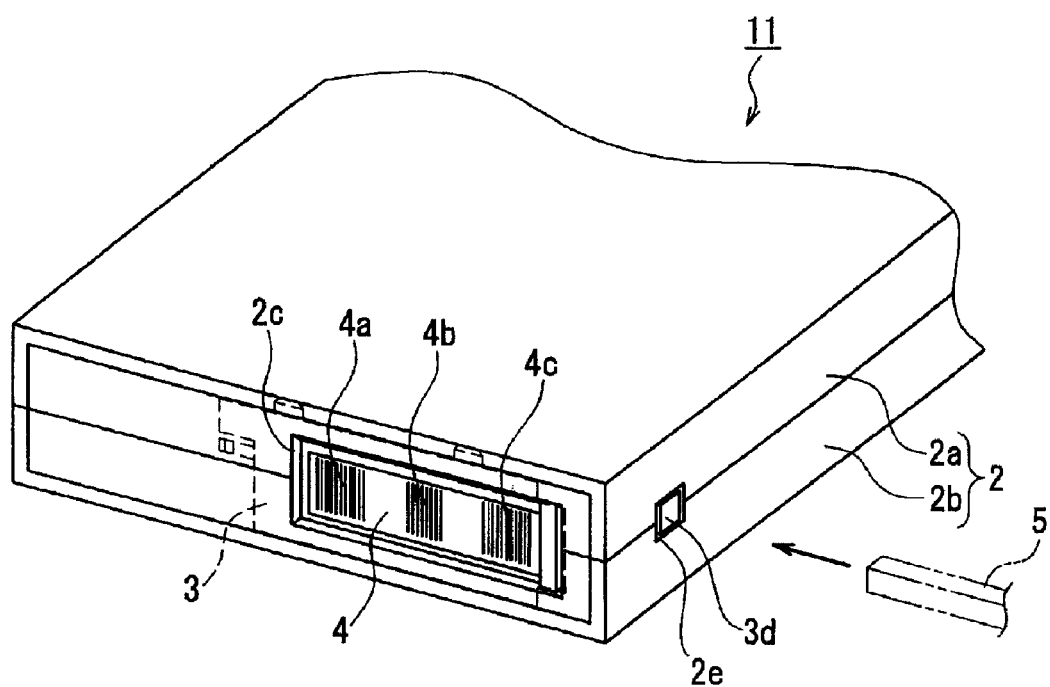
FIG. 7 is a perspective view showing one example of a tape cartridge of a second embodiment.
Figure 8A:
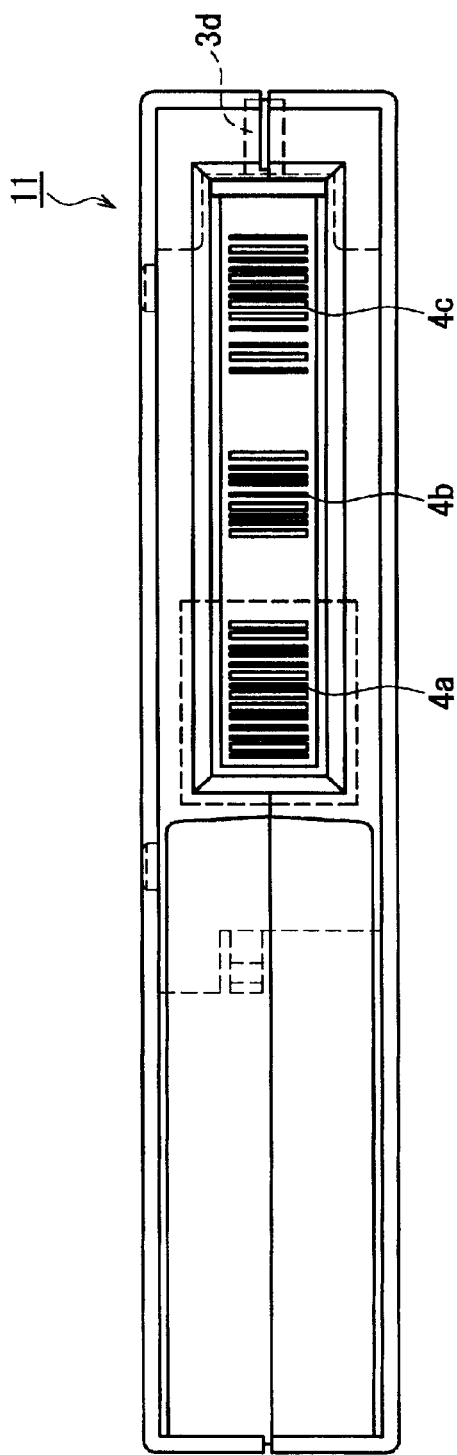
Figure 8B:
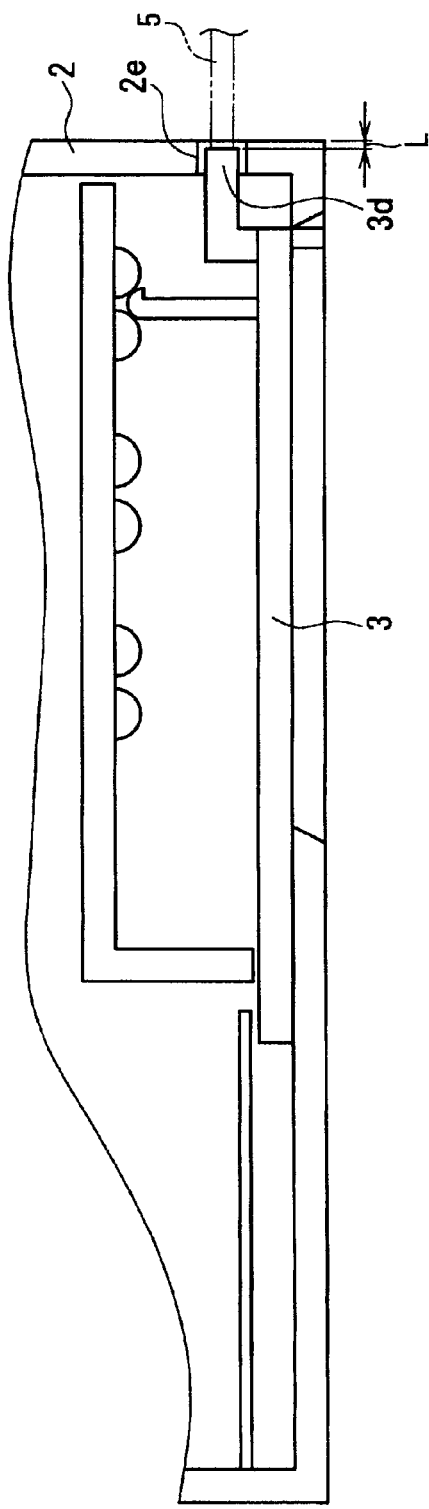
FIG. 8B is a plane view showing the same.
Figures 9A, 9B:
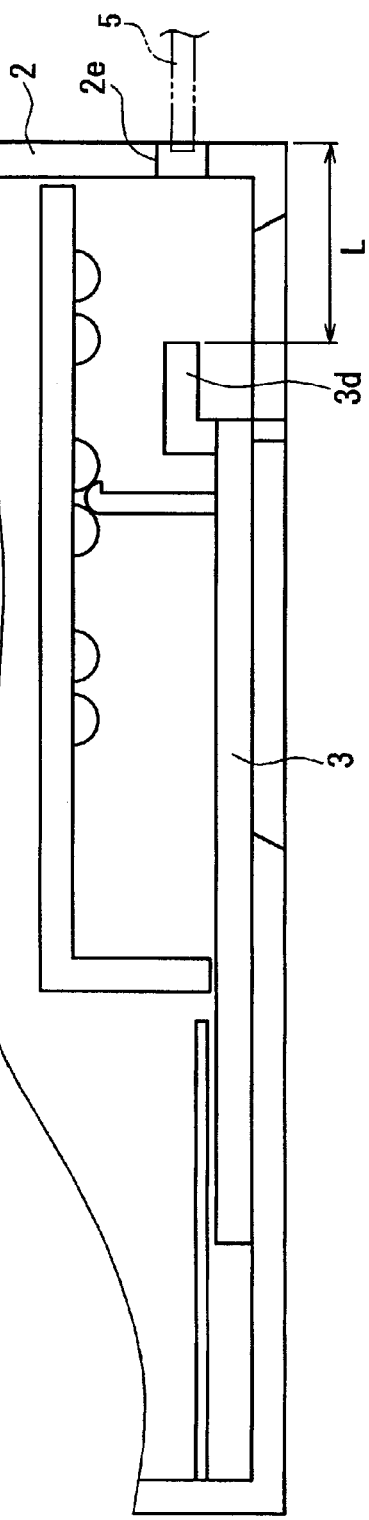
Figure 10A:
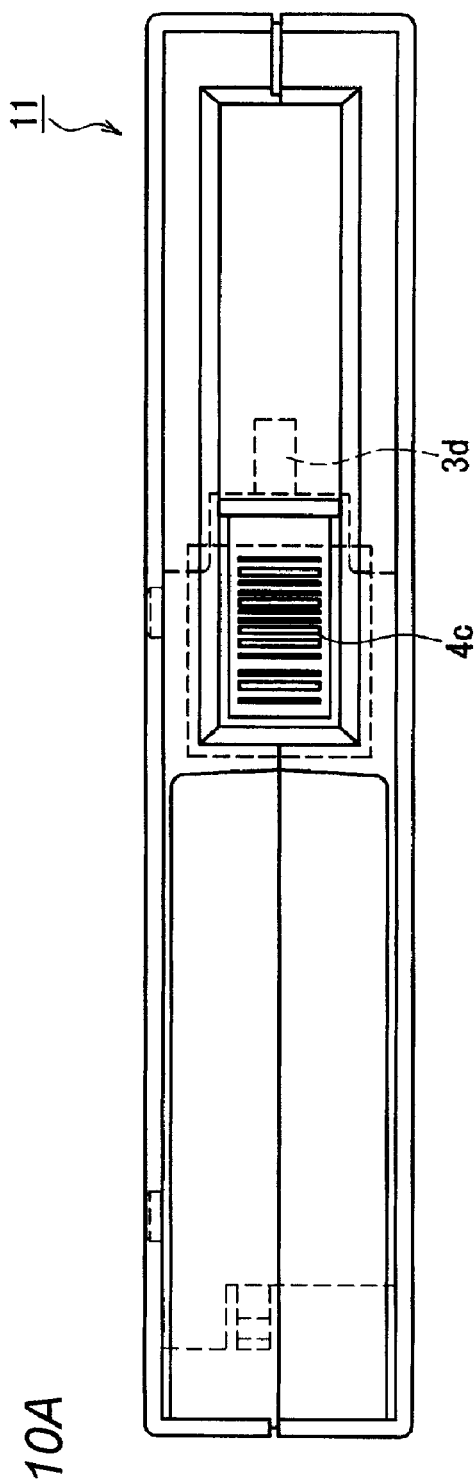
Figure 10B:
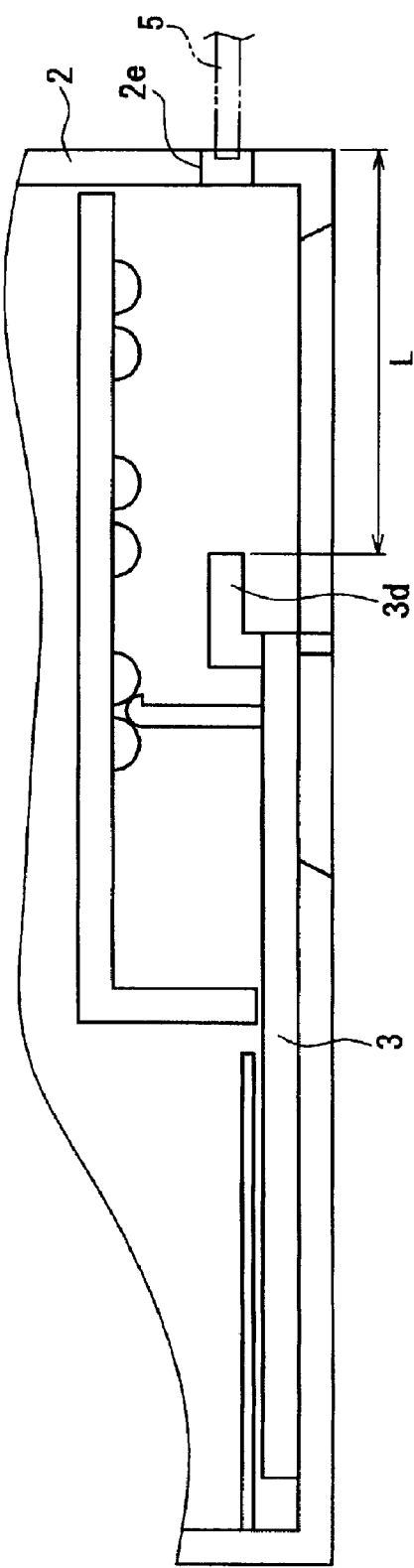
FIG. 10B is a plane view showing the same.

FIG. 7 is a perspective view showing a tape cartridge in this embodiment, FIG. 8A, FIG. 9A and FIG. 10A are rear views showing the tape cartridge shown in FIG. 7, FIG. 8B, FIG. 9B and FIG. 10B are plane views showing the tape cartridge shown in FIG. 7 without an upper cover 2a of the case. It is to be noted that in FIG. 7, reference numeral 2b denotes a lower cover of the case.

As shown in FIG. 7, the tape cartridge in the present embodiment is identical in structure to the tape cartridge in the first embodiment except that a movable member 3 is a write protector member capable of blocking information recording onto the magnetic tape and that a sensor hole 2e is formed on the case 2. It is to be noted that in FIG. 7, there are shown a label 4, management information sets 4a to 4c, and an operation window 2c.

As shown in FIG. 7, in the tape cartridge 11 in the present embodiment, a sensor hole 2e is formed on, for example, a lateral face of the case 2. The propriety of the recording is determined by, for example, detection of position information on a part (detection target portion 3d) of the movable member 3 visible from the sensor hole 2e by a detection member 5 of the drive. More specifically, for example, when the tape cartridge 11 is loaded into the drive, recording is determined to be possible if the detection member 5 comes into contact with the detection target portion 3d, whereas recording is determined to be impossible if the detection member 5 does not come into contact with the detection target portion 3d.

When the tape cartridge 11 in the state shown in FIG. 8A and FIG. 8B is loaded into the drive, the detection member 5 of the drive comes into contact with the detection target portion 3d of the movable member 3. By this, the drive recognizes that the tape cartridge 11 is in a recordable state.

When the tape cartridge 11 in the states shown in FIGS. 9A, 9B and FIGS. 10A, 10B is loaded into the drive, the detection member 5 of the drive does not come into contact with the detection target portion 3d of the write protector member 3. By this, the drive recognizes that the tape cartridge 11 is in an unrecordable state.

It is to be noted that the propriety of recording may be determined based on a distance L between a face of the case 2 including the sensor hole 2e and a face of the detection target portion 3d facing the outside of the case 2, which is detected by the detection member 5.

It is preferable that the management information set 4a includes an information set corresponding to a recordable state of the tape cartridge 11 and that the management information sets 4b, 4c include an information set corresponding to an unrecordable state of the tape cartridge 11. Thus, at least one management information set among a plurality of management information sets 4a to 4c includes an information set corresponding to the recordable state of the tape cartridge 11 while the remaining management information sets include an information set corresponding to the unrecordable state of the tape cartridge 11, which allows whether the tape cartridge 11 is in the recordable state or in the unrecordable state to be determined by the information recognition portion of the robot arm.

Therefore, in the tape cartridge in the present embodiment, the propriety of recording can be determined more swiftly than in the conventional tape cartridge in which the propriety of recording could be determined only with the detection member 5 of the drive, and as a result, it becomes possible to increase the library management efficiency (see FIG. 8A to 10B).

Third Embodiment

Figure 11A:
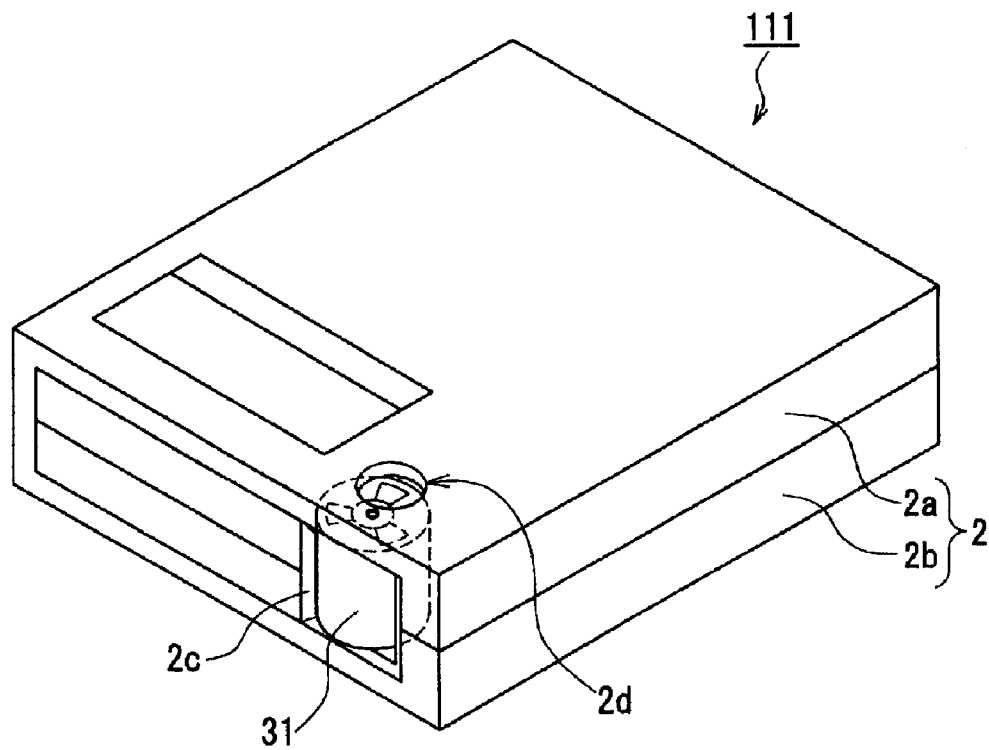
Figure 11B:
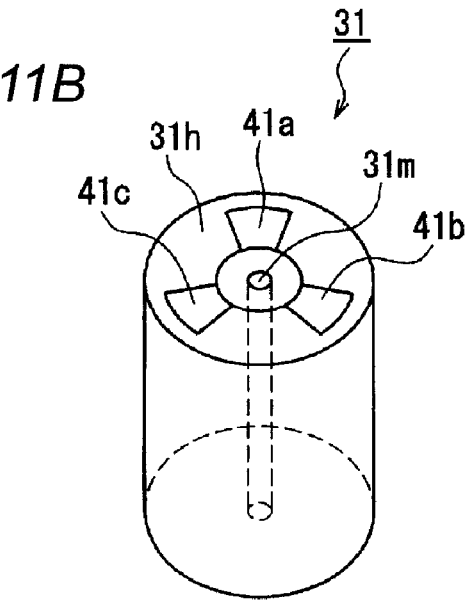
FIG. 11B and FIG. 11C are perspective views showing one example of a movable member constituting the tape cartridge shown in FIG. 11A.
Figure 11C:
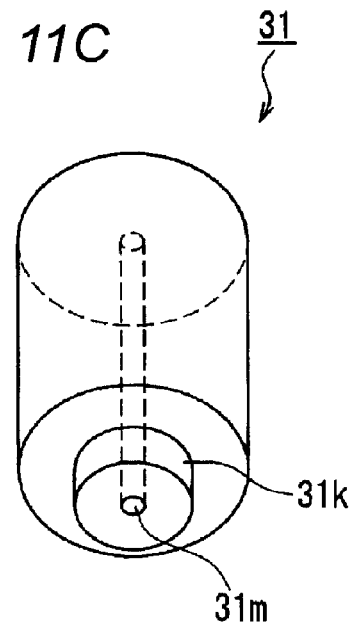
Figure 12:
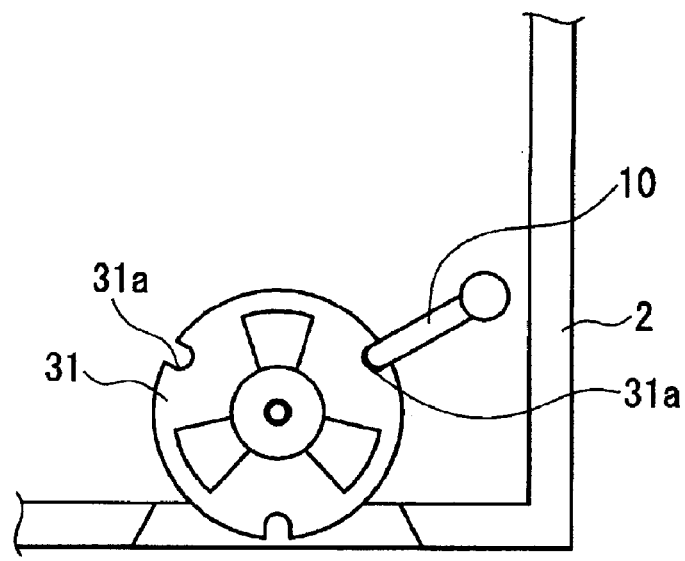
FIG. 12 is a plane view showing the tape cartridge shown in FIG. 11A without an upper cover of the case.
Figure 13A:
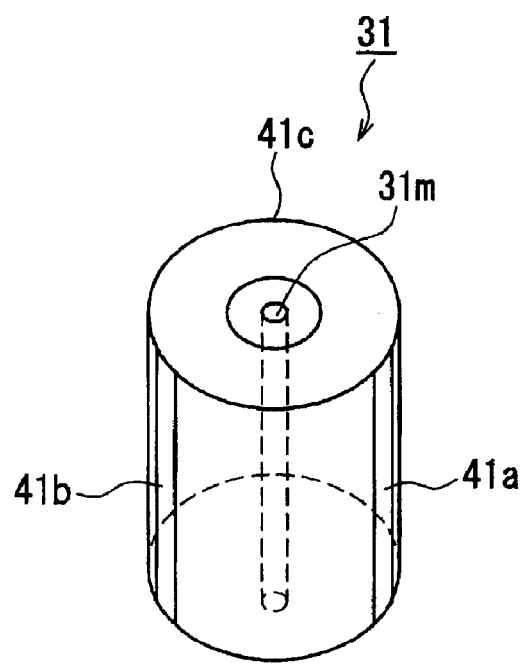
FIG. 13A and FIG. 13B are perspective views showing other examples of a movable member constituting the tape cartridge shown in FIG. 11A.
Figure 13B:
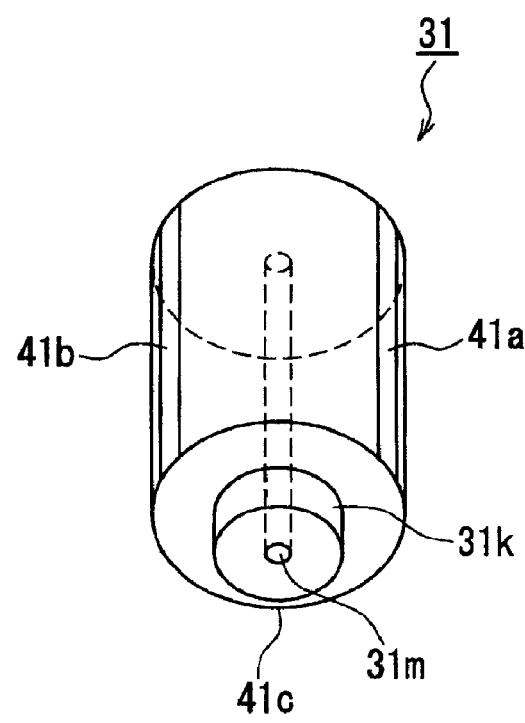
Figure 14:
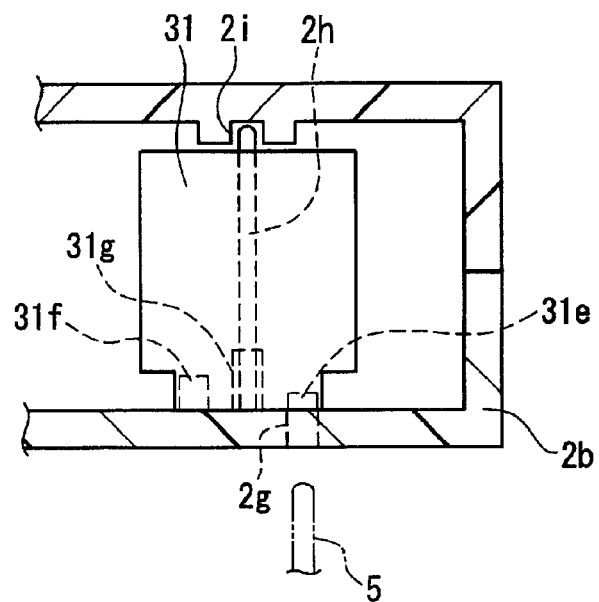
FIG. 14 is a fragmentary cross sectional view showing the tape cartridge shown in FIG. 11A.
Figure 15:
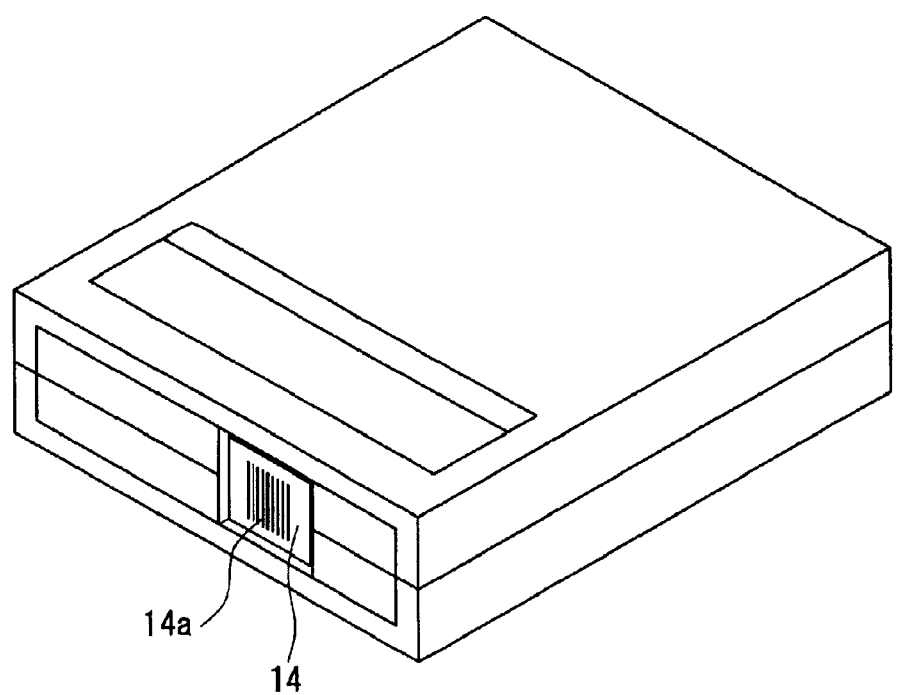
FIG. 15 is a perspective view showing one example of a conventional tape cartridge.

FIG. 11A is a perspective view showing a tape cartridge in this embodiment, and FIG. 11B and FIG. 11C are perspective views showing one example of a movable member constituting the tape cartridge shown in FIG. 11A. FIG. 12 is a plane view showing the tape cartridge shown in FIG. 11A without an upper cover 2a of the case. FIG. 13A and FIG. 13B are perspective views showing other examples of the movable member constituting the tape cartridge in the present embodiment. FIG. 14 is a fragmentary cross sectional view showing the tape cartridge 111 shown in FIG. 11A. It is to be noted that reference numeral 2b denotes a lower cover of the case 2 in FIG. 11A and only a case is represented by a cross section in FIG. 14.

As shown in FIGS. 11A to 1C, in the tape cartridge 111 in the present invention, a movable member 31 is in an almost cylinder shape. The movable member 31 is fixed onto the case 2 rotatably around its central axis.

In the example shown in FIGS. 11B and 11C, a through hole 31m is formed in the movable member 31. By inserting a spindle 2h (see FIG. 14) protruded on a lower cover 2b of the case into the through hole 31m, the movable member 31 is rotatably fixed onto the case. A bearing 2i (see FIG. 14) of an upper cover of the case 2 suppresses oscillation of the spindle 2h. By rotating around the spindle 2h, the movable member 31 rotates around its central axis. Moreover, the movable member 31 has a small diameter portion 31k.

As shown in FIG. 11A, the movable member 31 is rotationally operable from an operation window 2c formed on, for example, the rear face of the case 2. A part of a display portion 31h of the movable member 31 (upper face of the movable member 31) is visible from an opening 2d formed on the case 2. A plurality of management information sets 41a to 41c (barcodes unshown) are displayed on the upper face of the movable member 31 almost at 120 degree intervals. When the tape cartridge 111 is chucked by a robot arm, the inside of the opening 2d is recognized by an information recognition portion of the robot arm. Except this, the tape cartridge 111 in the present embodiment is identical in structure to the tape cartridge in the first embodiment and therefore has the same effects.

In the tape cartridge 111 in the present embodiment, the movable member 31 is in an almost cylinder shape which allows selection of a specified management information set from a plurality of management information sets by rotational operation, and therefore it becomes possible to mount the movable member in a smaller space than in the tape cartridge in the first embodiment.

It is preferable that as shown in FIG. 12, the tape cartridge in the present embodiment has a retention piece 10 fixed to a specified position of the case, and that a plurality of engagement grooves 31a capable of retaining the retention piece 10 so as to retain the movable member 31 in a specified rotation position are formed on the movable member 31 along its axial direction. The tape cartridge has the retention piece 10, and a plurality of the engagement grooves 31a are formed on the movable member 31, so that the operation to retain the movable member 31 in a specified position can be performed easily and reliably.

In the example shown in FIG. 12, the retention piece 10 is, for example, in a plate shape, and its principle surface is disposed so as to be in parallel to the thickness direction of the case 2, and only one end portion side thereof is fixed onto the case 2. It is preferable that the retention piece 10 is elastically deformable upon coming into contact with the surface of the movable member 31.

In the example shown in FIG. 11B, the location of the display portion 31h, i.e., the display location of a plurality of the management information sets 41a to 41c, is the upper face of the movable member 31. However, the location of the display portion 31h is not limited thereto. The location of the display portion 31h may be the lateral face (curved face) or the lower face of the movable member 31. As shown in FIGS. 13A and 13B, a plurality of the management information sets 41a to 41c (barcodes unshown) may be displayed on, for example, a lateral face of the movable member 31.

It is preferable that the movable member 31 has a function as a write protector member as with the case of the second embodiment. In the example shown in FIG. 14, a plurality of recess portions 31e, 31f, 31g having different depths are formed on the bottom face of the movable member 31. A sensor hole 2g is formed in a specified location on the lower cover 2b of the case. A plurality of the recess portions 31e, 31f, 31g are formed, for example, at almost 120 degree intervals. When the tape cartridge is loaded into the drive, a detection member 5 of the drive is inserted into the sensor hole 2g. The detection member 5 detects, for example, the depth of the recess portions 31e, 31f, 31g. The propriety of recording is determined based on the difference in depth of these recess portions.

The movable member 31 is rotated so that a management information set 41a is disposed inside the opening 2d (see FIG. 11A) and the recess portion 31e is linked to the sensor hole 2g. When the tape cartridge is loaded into the drive in this state, the depth of the recess portion 31e is detected by the detection member 5 of the drive. Based on the detected depth of the recess portion 31e, the drive recognizes that the tape cartridge is in a recordable state for example.

The movable member 31 is rotated so that a management information set 41b is disposed inside the opening 2d (see FIG. 11A) and the recess portion 31f is linked to the sensor hole 2g. Alternatively, a management information set 41c is disposed inside the opening 2d (see FIG. 11A) and the recess portion 31g is linked to the sensor hole 2g. When the tape cartridge is loaded into the drive in these states, the depth of the recess portions 31f, 31g is detected by the detection member 5 of the drive. Based on the detected depth of the recess portions 31f, 31g, the drive recognizes that the tape cartridge is in an unrecordable state for example.

Thus, when the movable member 31 is also a write protect member, it is preferable that, for example, the management information set 41a includes an information set corresponding to a recordable state of the tape cartridge, and the management information sets 41b, 41c include an information set corresponding to an unrecordable state of the tape cartridge. Thus, at least one management information set among a plurality of management information sets 41a to 41c includes an information set corresponding to the recordable state of the tape cartridge while the remaining management information sets include an information set corresponding to the unrecordable state of the tape cartridge 11, which allows whether the tape cartridge is in the recordable state or in the unrecordable state to be determined by the information recognition portion of the robot arm (see FIG. 11A).

Therefore, in the tape cartridge in the present embodiment, as with the case of the tape cartridge in the second embodiment, the propriety of recording can be determined more swiftly than in the conventional tape cartridge in which the propriety of recording could be determined only with the detection member 5 of the drive, and as a result, it becomes possible to increase the library management efficiency.

In the tape cartridge in the present invention, a specified management information set can be selected from a plurality of management information sets, and the management information sets can be changed without replacement of labels, which makes the tape cartridge in the present invention useful as a tape cartridge.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A tape cartridge, comprising:
   a case;
   a magnetic tape stored in the case; and
   a movable member slidably or movably mounted on the case and having a display portion at least part of which is visible from an outside of the case, wherein
   a plurality of management information sets about the tape cartridge are displayed on the display portion, and
   a plurality of the management information sets include one or more information sets different from each other, and wherein
   the movable member includes a plate portion slidable along a specified lateral face of the case.

2. The tape cartridge as defined in claim 1, wherein each of a plurality of the management information sets includes a plurality of information sets different in kind.

3. The tape cartridge as defined in claim 1, wherein a plurality of the management information sets are printed on a label and the label is affixed to the display portion.

4. The tape cartridge as defined in claim 1, further comprising a guide wall fixed onto the case, wherein
   the movable member includes an engagement piece protruding to an inside of the case, and
   the guide wall has a plurality of engagement portions formed along a sliding direction of the movable member for retaining the engagement piece so as to be able to retain the movable member in a specified position.

5. The tape cartridge as defined in claim 1, wherein the movable member is a write protector member for blocking information recording onto the magnetic tape.

6. The tape cartridge as defined in claim 5, wherein at least one management information set among a plurality of the management information sets includes an information set corresponding to a recordable state of the tape cartridge while remaining information sets include an information set corresponding to an unrecordable state of the tape cartridge.

7. The tape cartridge as defined in claim 5, wherein
   a sensor hole is formed in the case, and
   the movable member includes a detection target portion visible from the sensor hole.

8. A tape cartridge, comprising:
   a case;
   a magnetic tape stored in the case; and a movable member slidably or movably mounted on the case and having a display portion at least part of which is visible from an outside of the case wherein a plurality of management information sets about the tape cartridge are displayed on the display portion, and a plurality of the management information sets include one or more information sets different from each other, wherein the movable member is in an almost cylinder shape, and is fixed onto the case rotatably around its central axis, and wherein p1 the case includes an operating window through which the movable member can be operated and an opening through which the movable member can be operated and an opening through which the display portion can be viewed.

9. The tape cartridge as defined in claim 8, further comprising a retention piece fixed in a specified position of the case, wherein a plurality of engagement grooves are formed along axial direction for retaining the retention piece so as to be able to retain the movable member in a specified position.

10. The tape cartridge as defined in claim 8, wherein each of a plurality of the management information sets includes a plurality of information sets different in kind.

11. The tape cartridge as defined in claim 8, wherein a plurality of the management information sets are printed on a label and the label is affixed to the display portion.

12. The tape cartridge as defined in claim 8, wherein the movable member is a write protector member for blocking information recording onto the magnetic tape.

13. The tape cartridge as defined in claim 12, wherein at least one management information set among a plurality of the management information sets includes an information set corresponding to a recordable state of the tape cartridge while remaining information sets include an information set corresponding to an unrecordable state of the tape cartridge.

14. The tape cartridge as defined in claim 12, wherein
a sensor hole is formed in the case, and
the movable member includes a detection target portion visible from the sensor hole.

* * * * *

UNITED STATES PATENT AND TRADEMARK OFFICE
CERTIFICATE OF CORRECTION

PATENT NO. : 7,446,976 B2  Page 1 of 1
APPLICATION NO. : 11/290561
DATED : November 4, 2008
INVENTOR(S) : Teruo Sogabe It is certified that error appears in the above-identified patent and that said Letters Patent is hereby corrected as shown below:

In Claim 8, at Column 9, line 3, please insert a comma between "case" and "wherein" to read --case, wherein--.

In Claim 8, at Column 9, line 10, please delete "p1".

In Claim 8, Column 9, lines 12-13, please delete "the movable member can be operated and an opening through which".

Signed and Sealed this

Twenty-first Day of April, 2009

JOHN DOLL
*Acting Director of the United States Patent and Trademark Office*